United States Patent [19]

Thompson

[11] Patent Number: 5,414,757

[45] Date of Patent: May 9, 1995

[54] VOICE MAIL SYSTEM FOR NEWS BULLETINS

[75] Inventor: Richard L. Thompson, San Jose, Calif.

[73] Assignee: Octel Communications Corporation, Milpitas, Calif.

[21] Appl. No.: 12,567

[22] Filed: Feb. 2, 1993

[51] Int. Cl.⁶ ........................ H04M 3/50; H04M 1/65
[52] U.S. Cl. ......................................... 379/88; 379/67
[58] Field of Search ..................... 379/67, 88, 89, 84, 379/68, 76, 201

[56] References Cited

U.S. PATENT DOCUMENTS

| | | | |
|---|---|---|---|
| 4,612,416 | 9/1986 | Emerson et al. | 379/89 |
| 4,646,346 | 2/1987 | Emerson et al. | 379/89 |
| 4,837,798 | 6/1989 | Cohen et al. | 379/88 |
| 4,914,586 | 4/1990 | Swinehart et al. | 379/88 |
| 5,029,199 | 7/1991 | Jones et al. | 379/89 |
| 5,142,527 | 8/1992 | Barbier et al. | 379/88 |
| 5,301,226 | 4/1994 | Olsen et al. | 379/67 |

Primary Examiner—James L. Dwyer
Assistant Examiner—Scott L. Weaver
Attorney, Agent, or Firm—Elmer Galbi

[57] ABSTRACT

An improved method and apparatus for distributing news items to the users of a computerized voice mail system. The news items are stored on disk. A news item memory table is stored in active memory. The news items memory table has (a) message descriptors of a limited number of the latest news items and (b) time stamps showing the newest news item not referenced in said shadow table and the last time a news item not listed in the shadow table was changed. Each time a user interrogates an assigned mailbox, the system checks the news item memory table to determine if any items have been added or deleted since the last time the particular mailbox was interrogated. If there are new bulletins, these are read into the mailbox and if some items already in the mailbox have been obsoleted, the obsoleted items are deleted from the mailbox.

7 Claims, 4 Drawing Sheets

FIGURE 2A  Messages Shadow in Memory

| | |
|---|---|
| Descriptor First Cached Message | 201A |
| Descriptor Second Cached Message | 201B |
| Descriptor Third Cached Message | 201C |
| Time Stamp Non Cached Messages   TS-NCM | 202A |
| Time Stamp Deleted Message   TS-MD | 202B |

FIGURE 2B  Message Descriptor   MD

| | |
|---|---|
| ID - Message locaton - Drive and Sector | 211 |
| Scramble code - How to decode message | 212 |
| Time Stamp - When was message received | 213 |
| Length | 214 |
| Message attributes  - Urgent, etc | 215 |
| Information category, who from | 216 |

VOICE MAIL SYSTEM FOR NEWS BULLETINS

FIELD OF THE INVENTION

The present invention relates to information systems and more particularly to a voice mail system adapted to provide the user with current news updates.

BACKGROUND OF THE INVENTION

Voice mail systems generally provide voice "mailboxes" which are assigned to users. Callers can deposit (i.e. leave) recorded messages in a particular user's mailbox. A user can interrogate an assigned mailbox, obtain a count of the number of messages left by callers and retrieve any messages which have been left by callers.

U.S. Pat. No. 4,371,752 (Matthews) describes an early computerized voice mail system. In recent years computerized voice mail systems have come into wide spread use. Voice mail systems are commercially available from a wide variety of companies including Octel Communications Corporation. VMX Inc., International Business Machines Corp., etc.

Present day voice mail systems have the ability to send a voice message to a list of users. Thus, such systems can be used to quickly distribute news items to a designated list of users. However, it has been found that using a normal voice mail system to distribute news items has a variety of drawbacks. Some mailbox users do not regularly interrogate their mailboxes and thus the mailboxes tend to become cluttered with news messages. Furthermore messages left in a mailbox are normally retrieved in the order in which they were deposited, hence, a user may listen to one message only to find as he continues to listen to later messages that the first message has been superseded by a later message. The present invention provides an improved system for distribution of news messages by means of a voice mail system. With the present invention messages are not placed in a user's mail box at the time they are received by the system. Each time a user interrogates an assigned mailbox, the system checks to see if any current news items were received since this mailbox was last interrogated. If there are such news items they are transferred to the mailbox that is being interrogated.

SUMMARY OF THE INVENTION

The present invention provides an improved method and apparatus for distributing news items to the users of a computerized voice mail system. With the present invention a system includes both conventional mailboxes and news bulletin mailboxes. Each conventional mailbox can have one or more associated news bulletin mailboxes. Items placed in the news bulletin mailboxes are not sent to the conventional mailboxes when the items are received. Instead each time a conventional mailbox is accessed, the system determines if there are any items in the news bulletin mailboxes that should be transferred to the conventional mailbox which is being accessed. Items stored in the news bulletin mailboxes are stored on disk memory; however, each news bulletin mailbox has an associated shadow table stored in active RAM memory. Each of the shadow tables has message descriptors of a limited number of the items deposited in the associated news bulletin mailbox. Each shadow table also includes two time stamps. The first time stamp provides information concerning messages in the associated news bulletin mailbox whose message descriptors are not in the shadow table. The first time stamp shows when the newest such message was updated. The second time stamp relates to message descriptors which would not fit in the shadow table and which were deleted from the associated news bulletin mailbox. The second time stamp is equal to the time stamp of the most recent such message descriptor. Each time a conventional mailbox is interrogated by a user, the system checks the shadow tables of any news bulletin mailboxes assigned to the particular conventional mailbox to determine if any items have been added or deleted in these news bulletin mailboxes since the last time the particular conventional mailbox was interrogated. If there are news items in the user's mailbox that have been obsoleted, the obsoleted items are deleted from the users mailbox, and any new items in the news bulletin mailbox are added to the users mailbox. In general the users mailbox is updated from the information in the table in RAM memory without performing any disk reads and the only activity on the disk storage subsystem involves storing the updated user's profile back into the system memory portion of the disk memory. In some situations the number of new messages in a news bulletin mailbox will exceed the size of the shadow table in memory. In such situations a comparison of the time stamp in the conventional mailbox with the time stamps in a shadow table will indicate if news bulletins on the disk memory need to be interrogated in order to completely update the user's mailbox. In these situations the message descriptors of the news bulletins other than those in the shadow table need to be interrogated and disk access is necessary. However, this occurs in only a reasonably small percentage of situations. Since all message descriptors are copied to the user's mailbox which is non-volatile (i.e. which is stored on disk memory) a reliable count of the number of messages waiting can be given to a user prior to message review.

BRIEF DESCRIPTION OF THE FIGURES

FIG. 2A is a diagram of the shadow table stored in RAM memory.

FIG. 2B is a diagram of a message descriptor.

DETAILED DESCRIPTION OF A PREFERRED EMBODIMENT

The present invention is designed to work with a conventional computerized voice mail system. Such systems are for example shown in U.S. Pat. No. 4,371,752 (Matthews), U.S. Pat. No. 5,179,585 (MacMillan) issued Jan. 12, 1993 (was application Ser. No. 07/642,013 filed Jan. 16, 1992), and in copending application Ser. No. 07/831,464 filed Feb. 5, 1992, now U.S. Pat. No. 5,301,226 ..................(Olsen), which is assigned to the assignee of the present invention.

Figure 1:
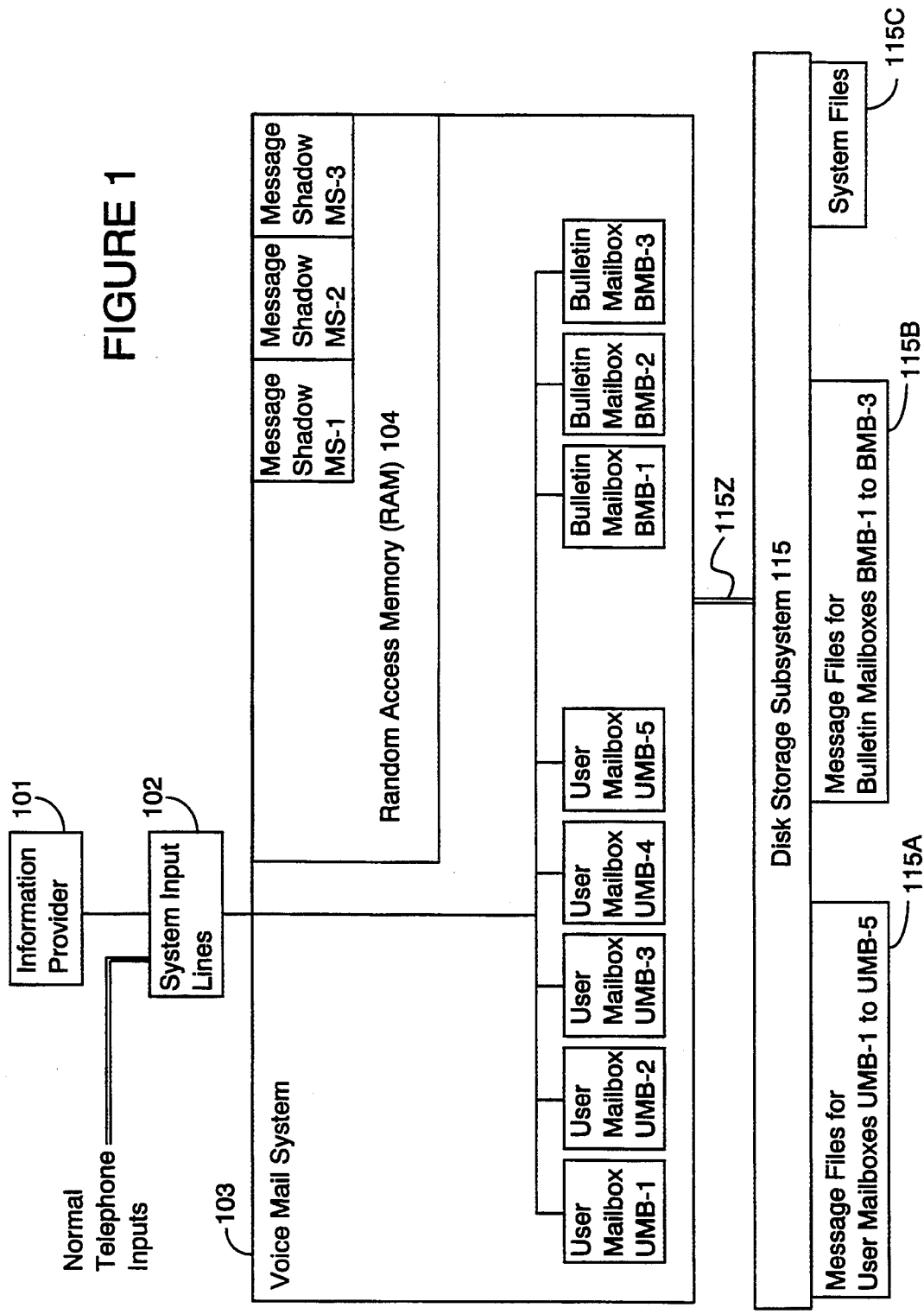
FIG. 1 is an overall diagram of the system.

An overall diagram of a preferred embodiment of the present invention is shown in FIG. 1. The system shown in FIG. 1 includes a computerized voice mail system 103 which has a disk storage subsystem 115. System 103 includes a plurality of conventional user voice mailboxes UMB-1 to UMB-5 and a plurality of special bulletin mailboxes BMB-1 to BMB-3. (For convenience of illustration only five users mailboxes UMB and three bulletin mailboxes BMB are shown in detail FIG. 1; however, it should be recognized a system could include many more such mailboxes. The system includes a conventional disk memory subsystem that stores messages and system information. As shown the disk subsystem stores messages for conventional user mailboxes UMB in section 115A, messages for bulletin mailboxes BMB in section 115B and system files such as user profiles in a section designated 115C. It is noted that while sections 115A and 115B are shown as separate rectangles in FIG. 1, messages from both types of mailboxes can be intermingled on a disk and access is via a conventional FAT table (not shown) and a conventional message location descriptor.

Information is provided to the bulletin mailboxes BMB-1 to BMB-3 from an information provider 101 via a communication link 102. The nature of the information provider 101 is not particularly relevant to the present invention. Information provider 102 could be a simple manual entry system whereby calls are manually made to voice mail system 103 and voice messages placed in bulletin mailbox BMB-1 to BMB-3. Alternatively message provider 102 could be a sophisticated link to one of the news wire services such as the "AP" or "UP" wire services which provide information to subscribes by a satellite link.

The present invention is directed to the technique and apparatus used to distribute messages from bulletin mailbox BMB to user mailboxes UMB. In a conventional computerized voice mail system, voice messages are stored on the associated disk storage subsystem such as disk subsystem 115 and each user mailbox has a user profile (herein designated UP). The user mailboxes can be accessed via telephone lines and messages can be left in the user mailboxes. A user can call the system and retrieve messages that have been left in a mailbox. Message retrieval is usually controlled by requiring a password in order to retrieve messages.

Figure 3A:
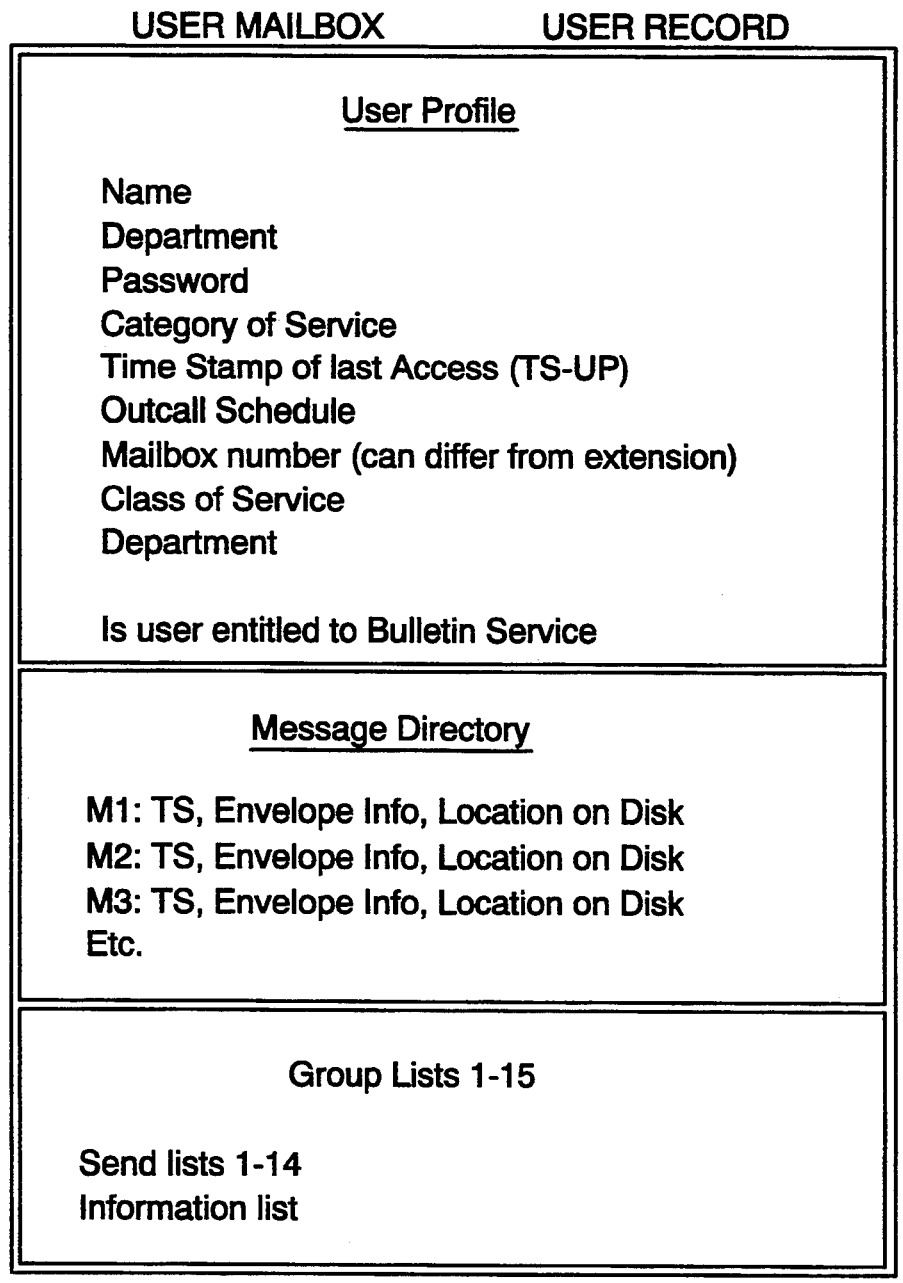
FIG. 3A is a diagram of a user profile.

In a conventional voice mail system and in the system described herein each user mailbox has an associated user profile such as that shown in FIG. 3A. The user profiles are normally stored in the system file section 115C of disk drive subsystem 115. When a mail box is accessed the profile is brought into active RAM memory In a conventional voice mail system, the messages which have been left (i.e deposited) for a user are referenced in a message directory section of the users record at the time the messages are deposited. Thus, in a conventional system when a user accesses his mailbox, all the messages that have been left for that user are already referenced in the user's message directory.

With the present invention, when messages are left in news bulletin mailboxes, the messages are not distributed to or referenced in the destination mailboxes until the destination mailboxes are accessed by a user seeking to retrieve messages. Furthermore, each bulletin mailbox BMB-1 to BMB-3 has an associated message shadow table MS-1 to MS-3 which is maintained in active RAM memory.

The present invention provides a highly efficient system for distributing bulletins which efficiently utilizes system resources. Significantly more system resources would be used if the system operated in a conventional manner whereby when a message destined for a number of user mailboxes is received, the bulletin is immediately distributed to the user mailboxes (i.e. the message is distributed in the sense that a reference is placed in each user's mailbox).

In a conventional system when a user accesses a mailbox to retrieve messages, the associated message directory is interrogated to determine what messages have been left in the mailbox. With the present invention when a user accesses a mailbox to retrieve messages, the system first interrogates the message shadow table in memory for each of the categories of messages which the particular user is authorized to receive. If there are appropriate messages, descriptors are placed in the user's message directory at this time. In most situations this operation does not involve reading any information from disk memory; however, as explained in detail later under some special circumstances the user may also have to access the disk drive subsystem to interrogate the entire list of messages in a bulletin mailbox. One key to the present invention is that message descriptors are not placed in a user mailbox until a user seeks to retrieve messages from a mailbox.

A diagram of showing the contents of a message shadow table associated with a bulletin mailbox is shown in FIG. 2A. The contents of a message descriptor is shown in FIG. 2B. A diagram showing the contents of a user record including the user profile, message directory and group lists is shown in FIG. 3A.

As shown in FIG. 3A, each user mailbox, that is each user record, includes the three sections, namely a user information section, a message directory section and a group list section. The user information section is conventional and it includes information such as the user's name, the user's department, the password, the category of service, a time stamp, designated TS-UP, showing the time that the mailbox was last accessed, a mailbox number, etc. The message directory section is also conventional and it gives the location of all messages that have been left in the mailbox. The third section of the user record, namely the group lists has two types of entries. The first fourteen entries in the group list section of the users profile are conventional and they list groups of mailboxes to which a message can be sent by merely accessing one of the group lists.

The last entry in the group lists section of the user record, indicates the particular types of information i.e. the bulletin mailboxes, that this particular user is authorized to access. If this list includes one or more entries, when a user mailbox is accessed the system interrogates the listed bulletin mailboxes to determine if there are any message descriptors that need be transferred to the users directory list and if there are any message descriptors in the message directory that need to be removed.

As shown in FIG. 2A in the present embodiment of the invention, each message shadow table includes up to three message descriptors 201A, 201B and 201C. These message descriptors provide information concerning the last three messages which were deposited in the associated bulletin mailbox (provided such messages are still current and have not been deleted). While each message shadow table shown herein includes three message descriptors, this number could be expanded if the voice mail system has additional available memory and the system could operate with less than three message descriptors stored in each shadow table. However, in many-situations three message descriptors in a shadow table is a reasonable compromise considering other demands on system memory.

Each message shadow table also includes two time stamps 202A and 202B. Entries are only placed in these time stamps when the memory shadow table is full (i.e. as shown herein when the memory shadow table has three entries). The first time stamp 202A, designated TS-NCM, indicates the time the fourth most recent news item (i.e. the most recent non-cached news item) was received by the system. As explained later, when a user mailbox is accessed, if this time stamp is more recent than the TS-UP time stamp (which indicates the last time the particular user mailbox was accessed) disk read operations are necessary to update the user mailbox. The second time stamp 202B, designated TS-MD (Time Stamp of Most Recent Message Descriptor), is only meaningful when there are four or more messages in the associated bulletin mailbox, that is, when TS-NCM is not zero. The TS-MD time stamp gives the time stamp of the most recent message descriptor which (1) was not in the shadow table and (2) was obsoleted (i.e. removed) from the associated news bulletin mailbox. If any message descriptor in a user mailbox has a time stamp which is older or equal to the TS-MD, then a disk read operation must be performed to determine which if any message descriptors should be deleted from the user mailbox. This will be explained in detail later with respect to FIG. 4.

Figure 4:
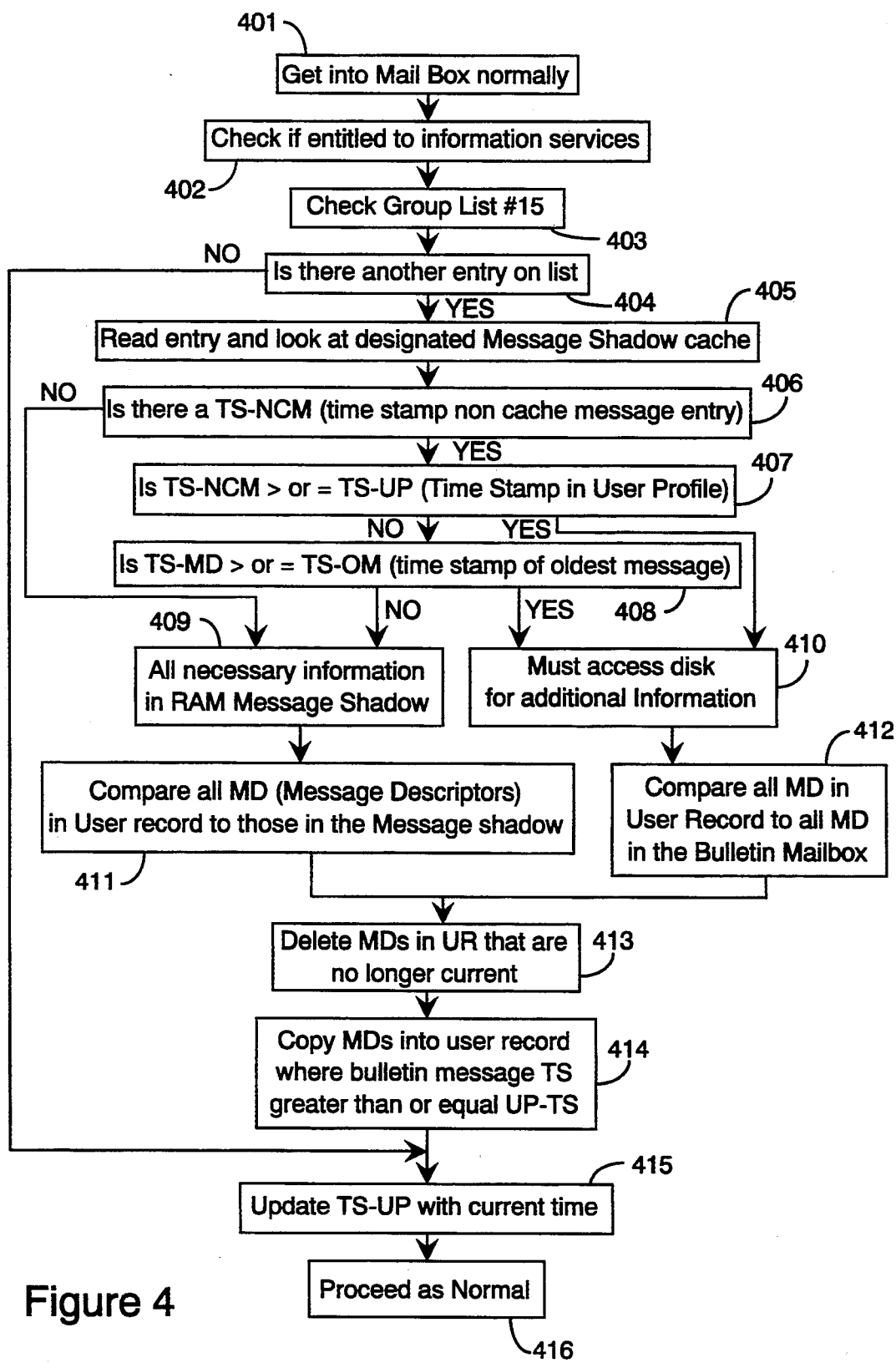
FIG. 4 is a flow diagram of the program which operates the system.

When a user accesses a mailbox, the sequence of operations shown in FIG. 4 takes places. FIG. 4 is a flow diagram for a sub-program which is executed by the general purpose computer which is not explicitly shown in the drawing but which is part of the voice mail system 103.

The following abbreviations which appear in FIG. 4 have the following meanings:
TS-NCM means Time Stamp Non Cache Message entry
TS-UP means Time Stamp User Profile
TS-MD means Time Stamp of Most Recent Message Descriptor
TS-OM means Time Stamp of Oldest Message
RAM means Random Access Memory
MD means Message Descriptor
UR means User Record
TS means Time Stamp
UP-TS means User Profile Time Stamp As shown by box 401 in FIG. 4, a user accesses a user mailbox in a normal fashion. Next (boxes 402 and 403) the system checks the last group list in the user's group lists to determine what, if any, bulletin services this particular user is authorized to receive. The information list in the group list section of a user profile can identify none, one, two, etc., of the bulletin mailboxes. As indicated by block 404, if all entries in the information list have not been processed the system proceeds to block 405 and reads the entry. Each entry in the information list points to one of message shadows MS-1 to MS-3.

As indicated by block 406, when a message shadow is accessed, the first entry interrogated is the TS-NCM time stamp 202A. If there is no entry in the TS-NCM, that is, if the entry is zero, all necessary information is in the shadow table and the system proceeds to block 409. If there is an entry in the TS-NCM time stamp, it is compared to the TS-UP time stamp in the users profile (block 407). The TS-UP time stamp indicates when the particular user mailbox was last accessed. If the time stamp TS-NCM is not greater than or equal to the stamp in the user profile TS-UP it means that the newest message not referenced in the message shadow table came to the system prior to the last time this particular user mailbox was accessed and it was of necessity processed previously. In this case the system goes on to block 408.

If the time stamp TS-NCM is greater than or equal to the stamp in the user profile TS-UP it means that the newest message not referenced in the message shadow table came to the system after the last time this particular user mailbox was accessed and of necessity it was not processed previously. In this case the system goes on to block 410 since it must retrieve message descriptors not in the shadow table.

If the TS-NCM time stamp is not greater than or equal to the TS-UP time stamp, the system goes to block 408. As indicated by block 408, the system checks to see if the TS-MD time stamp is greater than or equal to the time stamp of the oldest message in the user's message directory. The time stamp of the oldest message in the user's message directory is designated the TS-OM time stamp. The TS-MD time stamp indicates the time of the most recent message (not referenced in the shadow table) which was deleted. If the TS-MD time stamp is greater than or equal to the TS-OM time stamp, the system must access the message descriptors stored on disk and the system goes to block 410. If TS-MD is not greater than or equal to TS-OM all the relevant message descriptors are in the shadow memory.

If block 409 is followed, all the message descriptors in the user's mailbox are compared to those in the shadow table as indicated by block 411. If block 410 is followed, the message descriptors in the user's mailbox are compared to all the message descriptors in the bulletin mailbox. In any event, as indicated by block 413, the message descriptors in the user's mailbox which are no longer current (i.e. no longer in the bulletin mailbox) are deleted and (as indicated by block 414) any message descriptors in the bulletin mailbox which have not previously been transferred to the user mailbox are copied to the user mailbox.

As indicated by block 415, once the message directory in the user's mailbox has been updated, the time stamp showing the last access time, TS-UP, in the user's profile is updated.

As indicated by block 416, the system then proceeds as normal. Key to the operation of the present invention and key to the embodiment of the invention shown herein is the fact that messages are not placed in a user's mailbox when they are received by the system. That is, messages stored in bulletin mailboxes are not referenced in a normal user's mailbox at the time they are received by the system. When a user accesses a mailbox to retrieve messages, the first operation that occurs is a check of the appropriate bulletin mailboxes to retrieve any current bulletins which where not previously retrieved. It is noted that a bulletin can be sent to a bulletin mailbox and obsoleted before a user ever accesses his mailbox. Such a message will never reach such a user. This prevents a large number of messages from being accumulated in a user mailbox which is seldom accessed. Stated differently a user is assured that all messages in a user mailbox are current messages.

It is noted that whenever a message is placed in a bulletin mailbox BMB-1 to BMB-3, the associated message shadow MS-1 to MS-3 is updated in a manner that is similar to the manner that a user record is updated each time a message is sent to a user mailbox.

It is noted that a commercial system which embodies the present invention is commercially available from Octel Communication Corporation, of Milpitas, Calif. It is noted that the descriptive material available with the commercially available system uses the terminology of "news clips" instead of "bulletins" as used herein. As used with respect to the present invention the terms "clips" and "bulletins" are synonymous. It is also noted the commercially available system that embodies the present invention was not on sale for more than a year prior to the filing of present application.

While the invention has been shown with reference to a preferred embodiment, it will be understood by those skilled in the art that a large variety of other embodiments of the invention are possible. Applicant's invention is limited only by the appended claims.

I claim:

1. In a voice mail system for distributing news bulletins, said voice mail system including a disk storage subsystem, a random access memory (RAM), a plurality of user mailboxes, and means for enabling each of a plurality of users to interrogate a respective assigned mailbox, the voice mail system comprising:

bulletin mailbox means for storing ones of said news bulletins, said ones of said news bulletins in said bulletin mailbox means being stored on said disk storage subsystem, said ones of said news bulletins being deposited in said bulletin mailbox in a sequence beginning with a first news bulletin and ending with a last news bulletin, means for receiving the ones of said news bulletins and for depositing the ones of said news bulletins into said bulletin mailbox means, a news bulletin message memory shadow table stored in said RAM, said news bulletin message memory shadow table having stored therein message descriptors of a limited number of the ones of said news bulletins in said sequence stored in said bulletin mailbox means, and update means operative each time a particular user mailbox is interrogated for checking said news bulletin message memory shadow table to determine if any of the ones of said news bulletins have been added to said bulletin mailbox means and to determine if any of the ones of said news bulletins have been deleted from said bulletin mailbox means since a last time said particular user mailbox was interrogated, and for reading into said particular user mailbox any of said ones of said news bulletins which have been added and are not already in said particular user mailbox, and for deleting from said particular user mailbox any prior members of said ones of said news bulletins previously stored in said bulletin mailbox means but which have been deleted from said bulletin mailbox means.

2. The system recited in claim 1 including a plurality of said bulletin mailbox means 3. The system recited in claim 2 including a news bulletin message memory shadow table stored in said RAM for each of said plurality of bulletin mailbox means.

4. The system recited in claim 1 wherein said news bulletin message memory shadow table includes two time stamps including a first time stamp as a time a member of said ones of said news bulletins not listed in said news bulletin message memory shadow table was received and deposited by said receiving means and a second time stamp as a time a prior member of said ones of said news bulletins not in said news bulletin message memory shadow table was deleted, and each of said user mailbox has a user mailbox time stamp showing a last time said user mailboxes was accessed.

5. The system recited in claim 4 including means for storing a complete list of current news bulletins on said disk storage subsystem, each current news bulletin being associated with a deposit time stamp, and for interrogating a first time stamp in said news bulletin message memory shadow table each time said news bulletin message memory shadow table is interrogated to determine if a selected news bulletin deposit time stamp is later than said user mailbox time stamp.

6. In a voice mail system for distributing bulletins to a plurality of user mailboxes each of which can be interrogated by a user, said voice mail system including a disk storage subsystem, a random access memory (RAM), a plurality of user mailboxes, bulletin mailbox means for storing ones of said bulletins, said ones of said bulletins in said bulletin mailbox means being stored on said disk storage subsystem, and means for depositing said ones of said bulletins into said bulletin mailbox means, the method of:

storing message descriptors of a plurality of bulletins in a news bulletin message shadow memory table stored in said RAM, and checking said bulletin message shadow memory table each time a user interrogates a particular user mailbox, said checking step being performed to determine if any of said ones of said bulletins have been added to and if any of said ones of said bulletins have been deleted from said bulletin mailbox means since said particular user mailbox was last interrogated, and for reading into said particular user mailbox any of said ones of said bulletins not already in said particular user mailbox, and for deleting from said particular user mailbox any of said ones of said bulletins in said particular user mailbox corresponding to the one of said bulletins deleted from said bulletin mailbox means.

7. A voice mail system which includes a random access memory and a disk memory, a plurality of user mailboxes, a plurality of news bulletin mailboxes, each of said news bulletin mailboxes having an associated news bulletin message memory shadow table stored in said RAM for storing message descriptors of a plurality of messages in each of the plurality of associated news bulletin mailboxes, and means for interrogating said news bulletin message memory shadow table each time a user mailbox is accessed, said means for interrogating including means for duplicating in said user mailbox, the message descriptors in said news bulletin message memory shadow table and for removing from said user mailbox, message descriptors corresponding to prior members of the plurality of messages stored in each of said news bulletin mailboxes, whereby the message descriptors in said news bulletin message memory shadow table are duplicated placed in said user mailboxes when said user mailboxes are accessed and not when said new bulletins are received.

* * * * *